UNITED STATES PATENT OFFICE 2,105,456

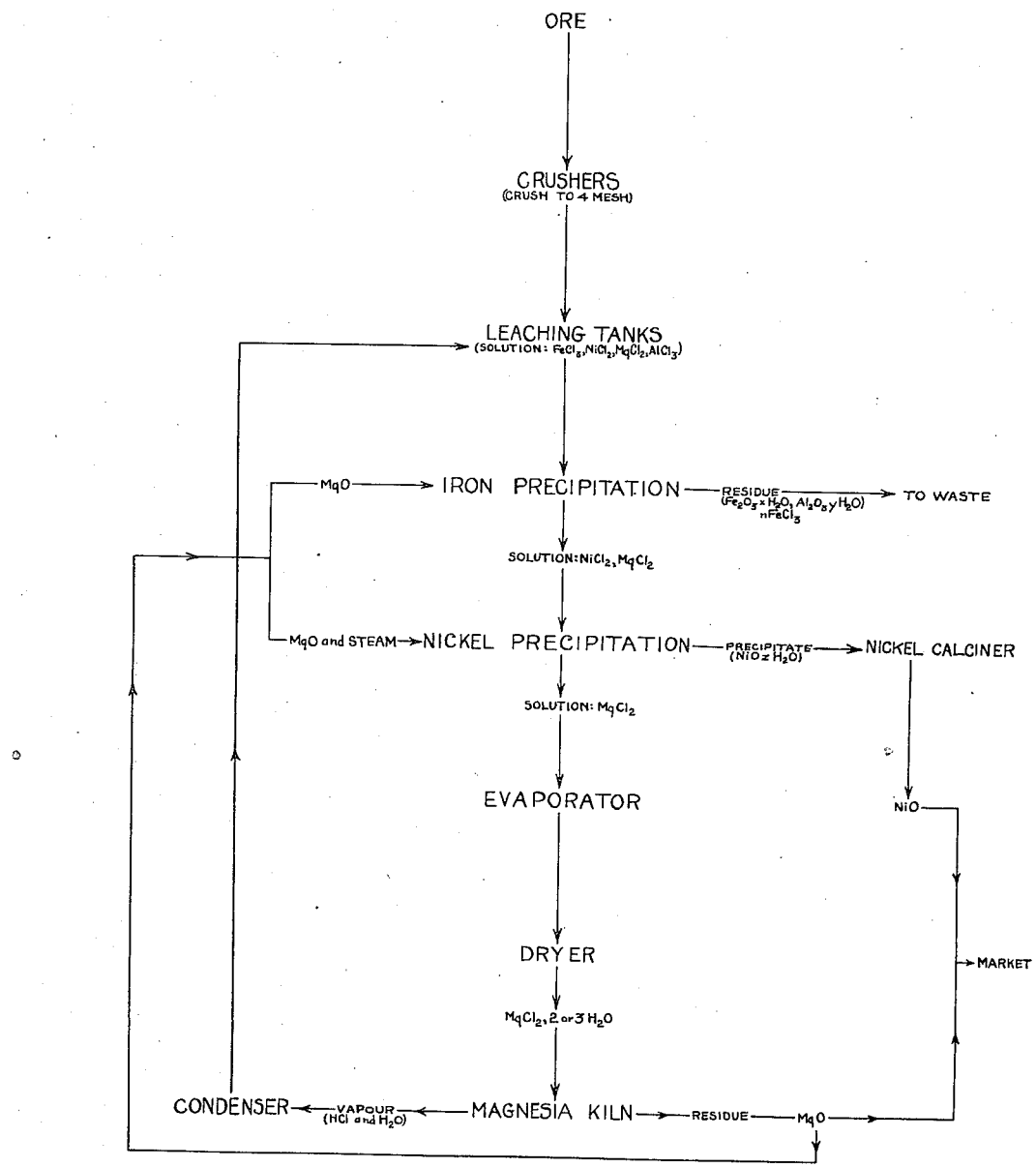

METHOD OF TREATING LATERITIC ORES

William George Hubler and Frederick Ratcliffe Archibald, Duparquet, Quebec, Canada, assignors to Ventures Limited, Toronto, Ontario, Canada Application April 24, 1937, Serial No. 138,690

6 Claims. (Cl. 75—114)

This invention relates to an improved method of treating lateritic ores, commonly known as garnierite or noumeite, which are low grade nickel ores containing varying amounts of iron and magnesia, the latter at least mainly in the form of hydrous magnesium silicate, and particularly to a method of treating such ores containing not substantially more than 5% of nickel which cannot be extracted commercially by any heretofore known method.

Such ores are a potential source of large quantities of nickel and many methods have been proposed for the recovery of the nickel but for various reasons none of these methods has proven feasible from a commercial point of view. It is known that aqueous solutions of strong acids dissolve both the nickel and iron in such ores but the disposition of the iron has offered insuperable difficulties. The same is true of various chloridizing processes heretofore proposed. It has been proposed to treat such ores with such a small quantity of mineral acid as will act as a selective solvent for the nickel.

The object of the present invention is to provide a method whereby such ores can be economically treated for the recovery of the nickel, with magnesia as a valuable by-product and the regeneration of the acid for reuse. A further object is to provide a method in which solution of the iron does not offer undue difficulty and in which a portion of the iron may be reprecipitated in the leaching operation without precipitating the nickel.

The invention thus contemplates a straight leaching method which may be carried out in ordinary equipment, without heat, and without any special preliminary treatment of the ore and which provides a solution from which iron, aluminum and nickel may be selectively precipitated, leaving a solution from which magnesia may be readily recovered with the regeneration for reuse of the leaching acid. In other words the invention contemplates the provision of a simple leaching process followed by precipitation, without additional expense in the preparatory treatment of the ore or in promoting solution or precipitation, in which the leaching acid is regenerated while recovering the precipitant together with the magnesia dissolved from the ore.

In carrying out the invention the ore is crushed to pass about a 4 mesh screen and is leached with a dilute solution of hydrochloric acid to form chlorides of the nickel, magnesium, iron and aluminum in the ore and these are selectively precipitated from the solution with magnesia, the iron and alumina being first removed, then the nickel, which is calcined to produce the oxide, and the acid is recovered from the magnesium chloride for cyclic reuse leaving magnesia in pure form as a valuable by-product.

A flow sheet illustrating the successive steps of the method is shown on the accompanying drawing.

The essential controlling features of the successive steps will now be described.

Control of the concentration of the acid leaching solution is important and to some extent the initial concentration is determined by the concentration of the acid recovered from the magnesium chloride decomposition. The acid concentration should be within the limits of 4 to 20% and the leaching continued until the free acid strength falls below 1% of HCl. The solution is used cold and in proportions of not less than three to one of ore, to avoid excessive dissolution of iron and to permit the use of less expensive equipment. By continuing the leaching until the acid strength is less than 1% a portion of the iron is reprecipitated in the ore without precipitation of the nickel and the low acid strength solution left requires a minimum amount of precipitant to precipitate the iron, alumina and nickel selectively. Thus the leach may be started with relatively high acid concentration, for greater speed of initial reaction, and the solution automatically freed from excess iron by continuing the final stage of leaching until the acid concentration is reduced to the point indicated. This affords a selective extraction of the nickel over the iron and provides a final solution from which magnesia will effectively and selectively precipitate the metals in the desired order for efficient recovery of the nickel, as well as magnesia from the ore and that added as precipitant. Separation of the metals is more easily made from dilute solutions and thus it is more economical, in some cases at least, to use the acid direct from regeneration. Solutions containing less than 4% of hydrochloric acid are too weak for starting the leaching.

The chloride-containing leaching solution is withdrawn from the ore residue and treated with magnesia, as a fine dry powder or as a freshly prepared slurry to selectively precipitate metals. The hydrated ferric oxide and the aluminum hydroxide, being less soluble than nickel hydroxide, are precipitated first and substantially quantitatively without appreciable precipitation of nickel. When the iron and alumina are removed from the solution additional magnesia is added to precipitate the nickel and the latter is removed leaving in the solution as chloride the magnesium extracted from the ore and that added as precipitant.

The extracted nickel is calcined to produce nickel oxide as the finished product.

The remaining purified magnesium chloride solution is then concentrated, as by vacuum evaporation, and the crystallized magnesium chloride is treated, as by dry steam, to form magnesia as a commercial by-product and to regenerate hydrochloric acid. The liquor from the concentrator and the recovered acid are returned to the leaching solution storage for reuse.

It will be observed that the method is cyclic with the recovery for reuse of both the leaching acid and the precipitating reagent, magnesia. This results in great economy in the operation of the method and at the same time produces a by-product of increasing commercial value. Leaching with hydrochloric acid in the manner described and precipitating with magnesia combine to remove the difficulties heretofore occasioned by the substantial quantity of iron and magnesia in these ores.

We claim:

1. A method of treating hydrous silicate ores, containing iron, nickel and magnesium, such as garnierite or noumeite which comprises leaching the crushed ore with a cold, dilute solution of hydrochloric acid, removing from the resulting solution iron and nickel selectively and in the order named by precipitation with magnesia and recovering hydrochloric acid and magnesia from the remaining solution.

2. A method as defined in claim 1 wherein the leaching is continued until the HCl in the solution has been reduced to substantially 1%.

3. A method as defined in claim 1 wherein the initial acid concentration of the leaching solution is not less than 4% or more than 20%.

4. A method as defined in claim 1 wherein the proportion of leaching solution to ore is not less than substantially three to one.

5. A continuous cyclic method of treating hydrous silicate ores, containing iron, nickel and magnesium, such as garnierite or noumeite which comprises leaching the ore with a cold aqueous solution containing 4 to 20% of hydrochloric acid, adding to the solution magnesia to precipitate iron and alumina which are removed, and additional magnesia to precipitate nickel, removing the nickel, extracting hydrochloric acid and magnesia from the remaining solution and returning the acid and a portion of the magnesia for reuse in the leaching step.

6. A method as defined in claim 5 wherein the leaching is continued until the HCl in solution is reduced to at least 1% to reprecipitate iron in the ore.

WILLIAM GEORGE HUBLER.
FREDERICK RATCLIFFE ARCHIBALD.